(12) United States Patent
Ho et al.

(10) Patent No.: US 7,272,085 B2
(45) Date of Patent: Sep. 18, 2007

(54) APPARATUS HAVING SWITCHABLE SERVO GAINS AND OFFSETS FOR OPTICAL DISK DRIVE AND METHOD THEREOF

(75) Inventors: Hsu-Feng Ho, Taipei (TW); Shun-Yung Wang, Chu-Pei (TW)

(73) Assignee: Mediatek Inc. (TW)

( * ) Notice: Subject to any disclaimer, the term of this patent is extended or adjusted under 35 U.S.C. 154(b) by 393 days.

(21) Appl. No.: 10/710,416

(22) Filed: Jul. 8, 2004

(65) Prior Publication Data

US 2005/0105417 A1 May 19, 2005

(30) Foreign Application Priority Data

Nov. 19, 2003 (TW) .............................. 92132463 A

(51) Int. Cl.
*G11B 7/00* (2006.01)
(52) U.S. Cl. ................................. 369/44.29; 369/44.35
(58) Field of Classification Search ............. 369/44.29, 369/44.35
See application file for complete search history.

(56) References Cited

U.S. PATENT DOCUMENTS

| | | | | |
|---|---|---|---|---|
| 5,105,406 A | * | 4/1992 | Imanaka | 369/44.28 |
| 5,148,425 A | * | 9/1992 | Sakata | 369/44.25 |
| 5,251,194 A | * | 10/1993 | Yoshimoto et al. | 369/44.26 |
| 5,268,883 A | * | 12/1993 | Yamaguchi et al. | 369/30.13 |
| 5,436,877 A | * | 7/1995 | Ohshima | 369/44.35 |
| 6,917,571 B2 | * | 7/2005 | Kusumoto et al. | 369/44.29 |
| 7,092,323 B2 | * | 8/2006 | Tsai et al. | 369/44.29 |

FOREIGN PATENT DOCUMENTS

| | | | |
|---|---|---|---|
| JP | 07-279270 | | 10/1995 |
| JP | 10021566 A | * | 1/1998 |
| JP | 10-091971 | | 4/1998 |
| TW | 509913 | | 11/2002 |

* cited by examiner

*Primary Examiner*—Thang V. Tran
(74) *Attorney, Agent, or Firm*—Connolly Bove Lodge & Hutz LLP

(57) ABSTRACT

An apparatus having switchable servo gains and offsets for an optical disk drive adjusts its gains and offsets through the coupling of a servo signal and a switch with several changeable paths. The servo signals are either designated to undergo signal reduction with respect to a first offset through the switch and then be output after a first gain unit performed proportional conversion, or designated to undergo signal reduction with respect to a second offset and then be output after a second gain unit performed proportional conversion. The switch is switched on/off in the light of the working status of the pick-up head, for example, seeking or tracking, at a data area or at a blank area, and at a groove area or at a land area, so as to choose different offsets and gains to have the conversion of the servo signals.

12 Claims, 3 Drawing Sheets

APPARATUS HAVING SWITCHABLE SERVO GAINS AND OFFSETS FOR OPTICAL DISK DRIVE AND METHOD THEREOF

BACKGROUND OF THE INVENTION

The present invention relates to an apparatus having switchable servo gains and offsets for an optical disk device and the method thereof, and more particularly, to a servo control system of an optical disk device that makes adjustments in the gains and offsets according to the working status of the pick-up head.

The more progressive information technology is, the more versatile the kind of data storage is. In this regard, the optical disk drive has apparently become an important data storage tool available on the market. For an optical disk drive to operate, an electromechanical actuator drives a pick-up head so as to focus laser beams to be points on an optical disk. Then, any stored binary data is read and judged by the magnitude of the light rays received by a photo-detector; meanwhile, the received rays function as servo control signals for driving the pick-up head. In other words, the laser points are accurately focused on an adequate track, using such an optical signal to drive the pick-up head.

During the seeking process carried out by an optical disk drive, focus error (FE) signals is interfered with crosstalk that arises from the motion of the pick-up head along the radial direction of an optical disk. In other words, a carrier wave is induced on the FE signal from the interference of a tracking error (TE) signal. However, during the following or tracking process, the pick-up head moves from an inner portion to an outer portion along a spiral groove where data is recorded, thus the TE signal is almost inactive and the FE signal is free from the interference of the crosstalk effect on itself.

It is not feasible to adjust the gain of a conventional servo loop system for optical disk drives in the light of the working status of a pick-up head; thus, servo control is usually unstable, as it hardly converges. For instance, it is impossible to diminish the gain of the focusing loop system whenever seeking is underway; as a result, an inadequate response arises from that the interfering crosstalk signals are mistaken for normal FE signals. However, if the gain is set to a relatively small value, the response speed of the focusing loop control is compromised during the tracking process.

On the other hand, in regard to an ordinary optical disk, the reflectivity of a data area is different from that of a blank area. Hence, the photodetector of the pick-up head detects various reflective signals while it is passing the aforesaid areas. Data is saved in both the groove areas and the land areas of a DVD-RAM disk. Similarly, the reflective signals generated in the groove areas are different from those generated in the land areas where refractive indices are lower than the land areas' in terms of their characteristics. However, it is not also feasible to adjust the gain and the offset of the conventional servo loop system according to the position of the pick-up head where a data area or a blank area exists or where a groove area or a land area exists. By the same token, the servo control is unstable, as it hardly converges.

SUMMARY OF THE INVENTION

The objective of the present invention is to provide an apparatus having switchable servo gains and offsets for an optical disk drive and the method thereof, wherein the adjustments of the servo gains and offsets are depended on the working status of the pick-up head so as to stabilize the servo loop control system of the optical disk drive.

In order to achieve the objective, the present invention is to provide an apparatus having switchable servo gains and offsets for an optical disk drive and the method thereof, wherein adjustments in gains and offsets are achieved through the coupling of a servo signal and a switch with several changeable paths. The servo signals are to be either designated to be deducted a first offset through the switch and then output a converted signal in proportion to a first gain unit, or designated to be deducted a second offset, and then output a converted signal in proportion to a second gain unit. The switch is switched on/off in the light of the working status of the pick-up head, for example, seeking or tracking, at a data area or at a blank area, and at a groove area or at a land area, so as to choose different offsets and gains to have the conversion of the servo signals.

The input signal of the switch is a signal that results from the synthesis and amplification of a track error or a focusing error with a pre-amplifier. The input signal is subjected to conversion conducted by the first gain unit or the second gain unit, and then it is coupled to a controller.

BRIEF DESCRIPTION OF THE DRAWINGS

The invention will be described according to the appended drawings in which.

PREFERRED EMBODIMENT OF THE INVENTION

Figure 1:
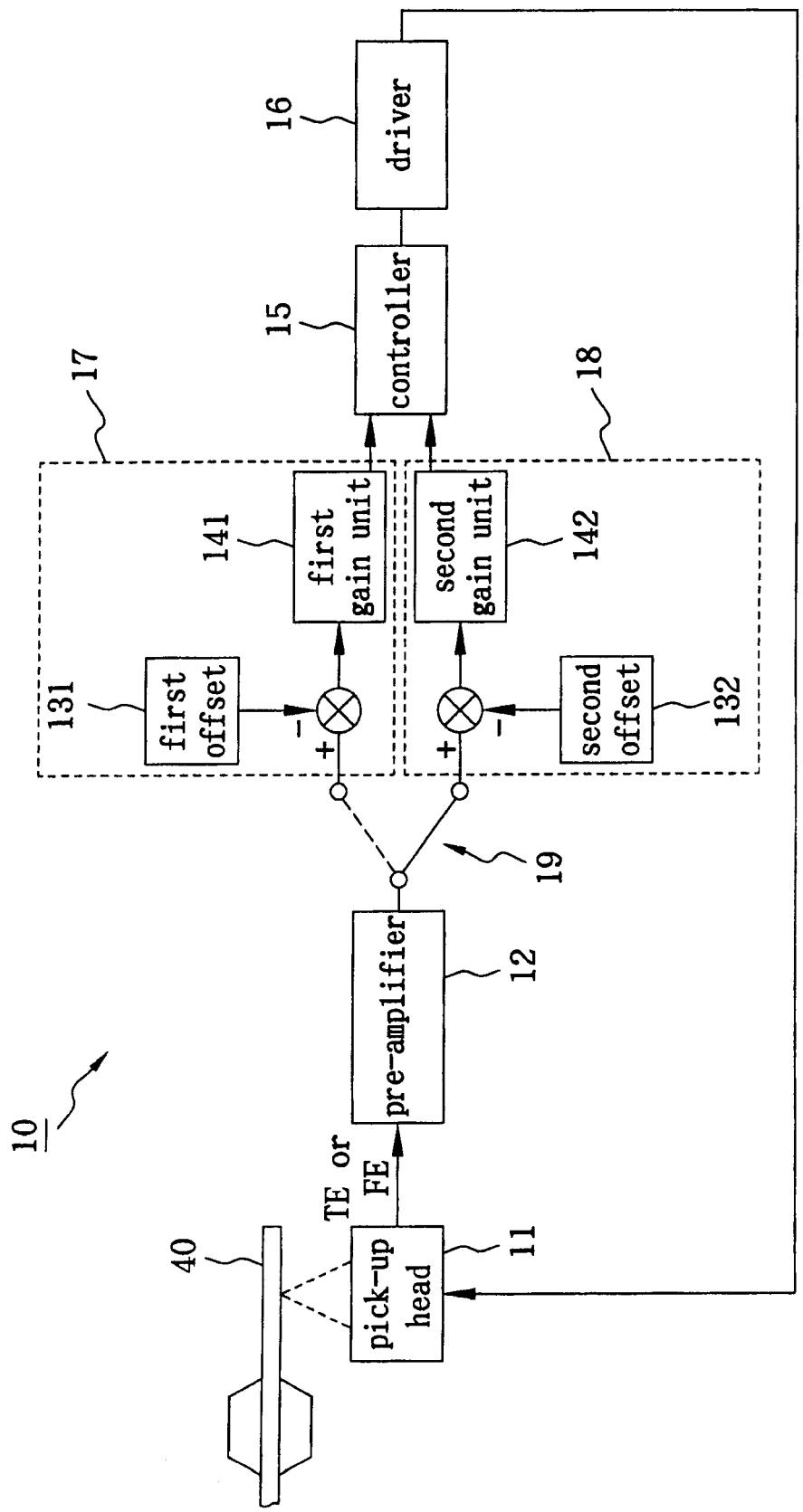
FIG. 1 is a schematic diagram of a servo control system for an optical disk drive in accordance with the present invention.

FIG. 1 is a schematic diagram of a servo control system of an optical disk drive in accordance with the present invention. The seeking or tracking servo control system 10 of the optical disk device is equipped with a pick-up head 11 intended to read data recorded in an optical disk 40. The pick-up head 11 generates a TE signal or a FE signal that functions as an input signal to the servo control system 10. The input signal is sent to a pre-amplifier 12 to have signal synthesis and amplification. With a switch 19, the amplified control signal is allowed to couple to either a first gain circuit 17 or a second gain circuit 18; with the first gain circuit 17, the amplified control signal has a slice level shift in response to a first offset 131, and then it is converted at a constant proportion by a first gain unit 141 before it is output; similarly, with the second gain circuit 18, the amplified control signal has a slice level shift in response to a second offset 132, and then it is converted at another constant proportion by a second gain unit 142 before it is output. The servo gain may be greater or less than one, or even a negative value.

The objective of the present invention is to normalize the input signals of a controller 15 by either the first gain unit 141 or the second gain unit 142, so as to enhance the stability of the servo control system. The control signal generated by the controller 15 makes a driver 16 output a driving signal, and the pick-up head 11 responds after it receives the driving signal.

According to the present invention, the switch 19 is switched on/off in light of the working status of the pick-up head 11. Its application to three statuses is as follows:

I. Seeking/Tracking

If the pick-up head 11 seeks tracks, the seeking or focusing servo control system makes the switch 19 switch to the second gain circuit 18 so as to reduce the sensitivity of the servo loop to noise signals by diminishing its servo gain. Conversely, if the pick-up head 11 is changed to track tracks, the switch 19 is switched to the first gain circuit 17, and the servo gain of the second gain circuit 18 is less than that of the first gain circuit 17.

Figure 2:
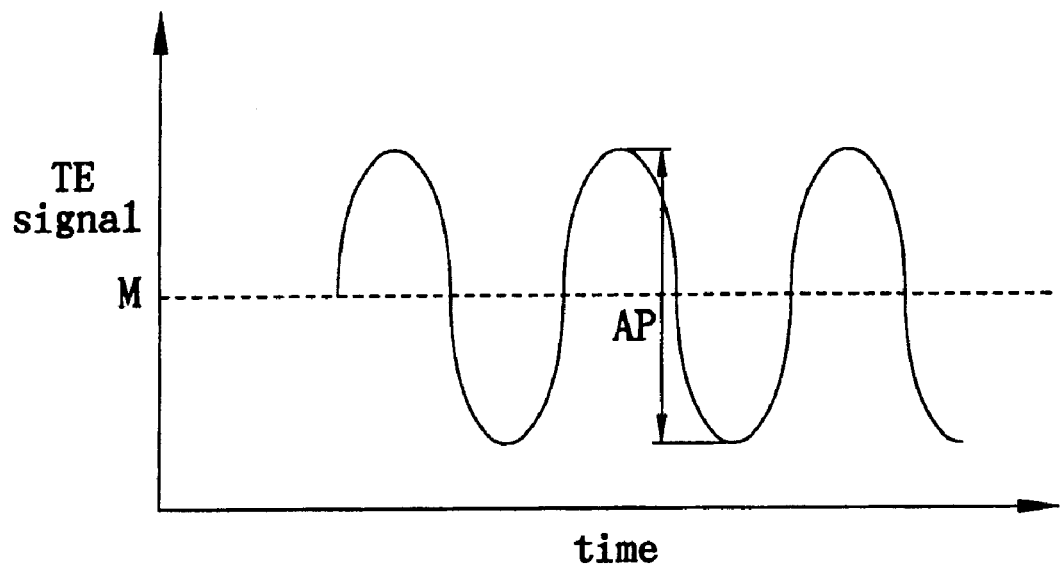
FIG. 2 is a waveform diagram of a TE signal.

The first offset 131 of the first gain circuit 17 and the magnitude of the gain of the first gain unit 141 can be determined by a track error or a focusing error intended for actual off-line detection (the second offset 132 and the gain value of the second gain unit 142 are determined in the same way). As shown in FIG. 2, it is a waveform diagram of a TE signal, wherein AP denotes the peak-to-peak (or crest-to-trough) interval of a TE signal, and M denotes a slice level, or a DC component. Also, servo control system designs always entail setting the peak-to-peak interval and the DC component. AP divided by a default peak-to-peak interval equals a quotient, and the quotient is designated as the gain of the first gain unit 141. Furthermore, the difference between the DC component actually measured and a default DC component is designated as the magnitude of the first offset 131.

II. Blank Area/Data Area

If the pick-up head 11 stays in a blank area, the servo control system makes the switch 19 switch to the second gain circuit 18 so as to decrease its servo gain. Conversely, if the pick-up head 11 stays in a data area to read data from there, the switch 19 is switched to the first gain circuits 17 so as to increase its servo gain.

Similarly, the corresponding magnitude of the gains and offsets can be obtained by the TE signal that is generated by the pick-up head staying either in the blank area or data area on-line. The calculating method of the magnitude is the same as the aforesaid descriptions.

III. Groove Area/Land Area

Figure 3:
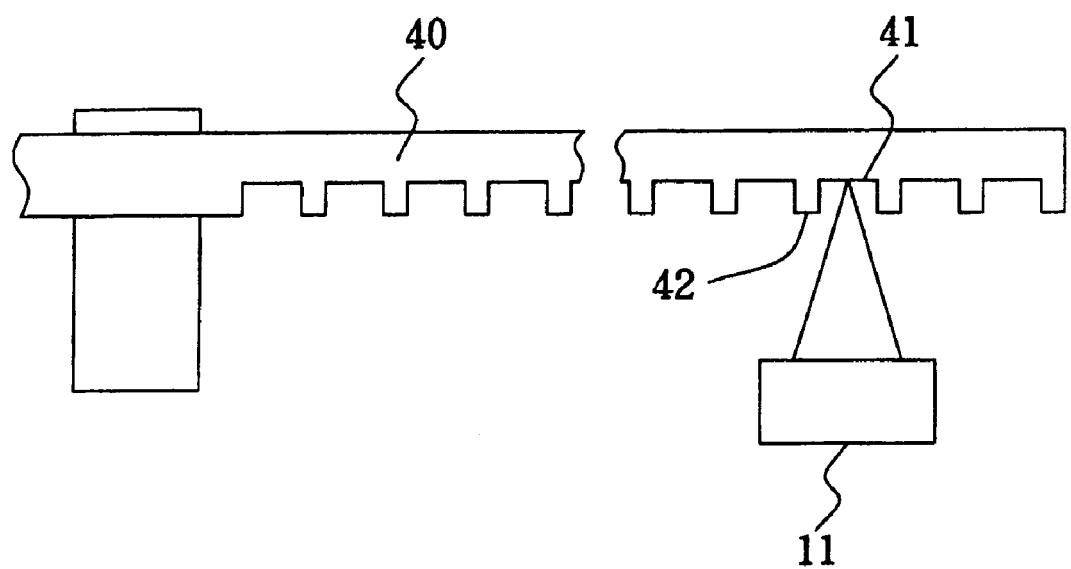
FIG. 3 is a schematic diagram showing that a pick-up head writes or reads data on an optical disk.
Figure 4:
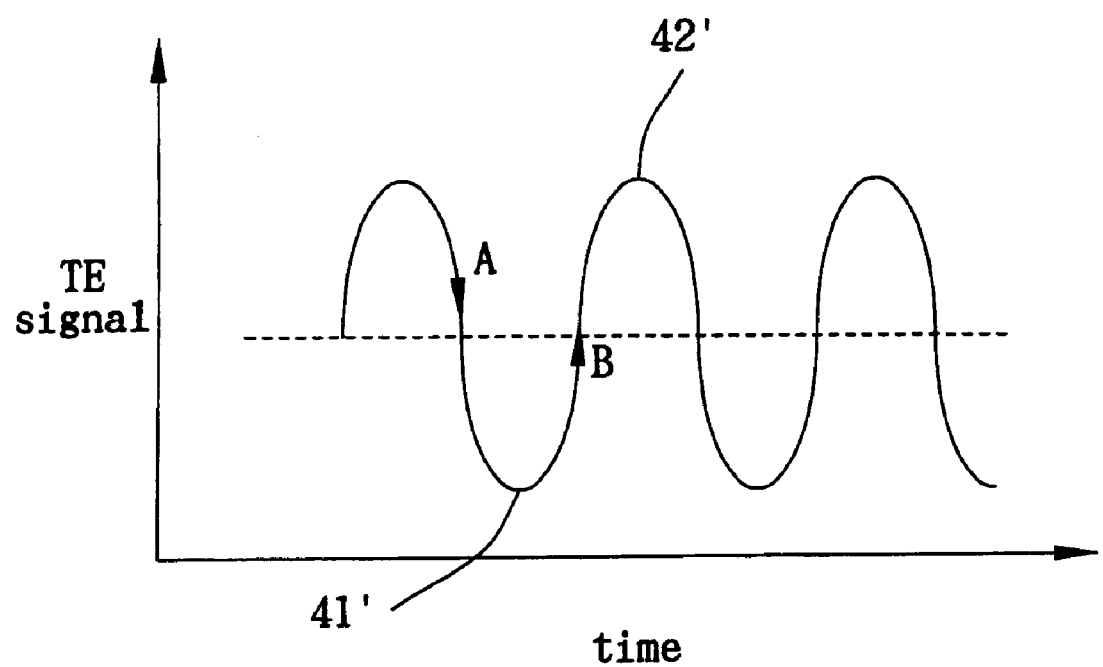
FIG. 4 is a waveform diagram of a TE signal in response to a DVD-RAM disk.

FIG. 3 is a schematic diagram showing how a pick-up head writes or reads data on an optical disk. Optical disks with ordinary specifications, such as CD-R, DVD-R and DVD-RW, always have data stored in their groove areas 41. However, DVD-RAM stores data in both the groove areas 41 and the land areas 42; for its corresponding TE signal, please refer to the trough 41' and the peak 42' in FIG. 4. The convergence direction A of the trough 41' is opposite to the convergence direction B of the peak 42'. Hence, the gain of the first gain circuit 17 and that of the second gain circuit 18 have opposite signs, where not only do their offsets have opposite signs, but also the magnitude of their offsets differ.

If the pick-up head 11 is in a groove area 41, the switch 19 is switched to the first gain circuit 17. If the pick-up head 11 is in a land area 42, the switch 19 is switched to the second gain circuit 18.

Digital signal processing (DSP) technique may be applied to the present invention, that is, the real-time status of a pick-up head is detected on-line while programs are running, so that switching occurs automatically in response to the various statuses mentioned earlier. With a DSP or an analog circuit, the peak and the trough of the servo signals can be measured so as to figure out the corresponding offset and gain. In other words, if an optical drive is at a read or write state, the peak-trough interval and the DC component determine the magnitude of the offset and the gain, as far as the real-time calculated TE signal (or FE signal) are concerned.

Furthermore, it is feasible to calculate the offset and the gain in an off-line, such as a free track-locking status and a focusing servo control status, that is, directly calculate the gain and the offset of a TE signal or a FE signal, using an open loop.

The above-described embodiments of the present invention are intended to be illustrative only. Numerous alternative embodiments may be devised by persons skilled in the art without departing from the scope of the following claims.

What is claimed is:

1. An apparatus having switchable servo gains and offsets for an optical disk drive, comprising:
    (a) a switch capable of transferring a servo signal to a first terminal or a second terminal of the switch according to a working status of the optical disk drive;
    (b) a first gain circuit connected to the first terminal of the switch, including:
        (1) a first offset for adjusting the offset value of the servo signal; and
        (2) a first gain unit for adjusting the servo gain of the servo signal; and
    (c) a second gain circuit connected to the second terminal of the switch, including:
        (1) a second offset for adjusting the offset value of the servo signal; and
        (2) a second gain unit for adjusting the servo gain of the servo signal, wherein the servo gain of the second gain unit is smaller than the servo gain of the first gain unit.

2. The apparatus having switchable servo gains and offsets for an optical disk drive of claim 1, wherein the servo signal is a tracking error (TE) signal or a focus error (FE) signal.

3. The apparatus having switchable servo gains and offsets for an optical disk drive of claim 1, further comprising a pre-amplifier connected to the switch for amplifying the servo signal.

4. The apparatus having switchable servo gains and offsets for an optical disk drive of claim 1, wherein the switch is switched to the second terminal if a pick-up head included in the optical disk drive is in a seeking status.

5. The apparatus having switchable servo gains and offsets for an optical disk drive of claim 1, wherein the switch is switched to the first terminal if a pick-up head included in the optical disk drive is in a tracking status.

6. The apparatus having switchable servo gains and offsets for an optical disk drive of claim 1, wherein the switch is switched to the second terminal if a pick-up head included in the optical disk drive is in a blank area of an optical disk.

7. The apparatus having switchable servo gains and offsets for an optical disk drive of claim 1, wherein the switch is switched to the first terminal if a pick-up head included in the optical disk drive is in a data area of an optical disk.

8. The apparatus having switchable servo gains and offsets for an optical disk drive of claim 1, wherein the switch is switched to the first terminal if a pick-up head included in the optical disk drive is in a groove area of an optical disk.

9. The apparatus having switchable servo gains and offsets for an optical disk drive of claim 1, wherein the switch is switched to the second terminal if a pick-up head included in the optical disk drive is in a land area of an optical disk.

10. The apparatus having switchable servo gains and offsets for an optical disk drive of claim 1, wherein the first gain unit and the first offset of the first gain circuit are separately determined by the comparison between a peak-to-peak interval on-line derived from a TE signal and a first default value and the comparison between a slice level on-line derived from the TE signal and a second default value.

11. The apparatus having switchable servo gains and offsets for an optical disk drive of claim 10, wherein the gain value of the first gain unit is obtained by the quotient that the peak-to-peak interval is divided by the first default value.

12. The apparatus having switchable servo gains and offsets for an optical disk drive of claim 10, wherein the offset value of the first offset is obtained by the difference between the slice level and the second default value.

* * * * *